United States Patent Office 2,934,587
Patented Apr. 26, 1960

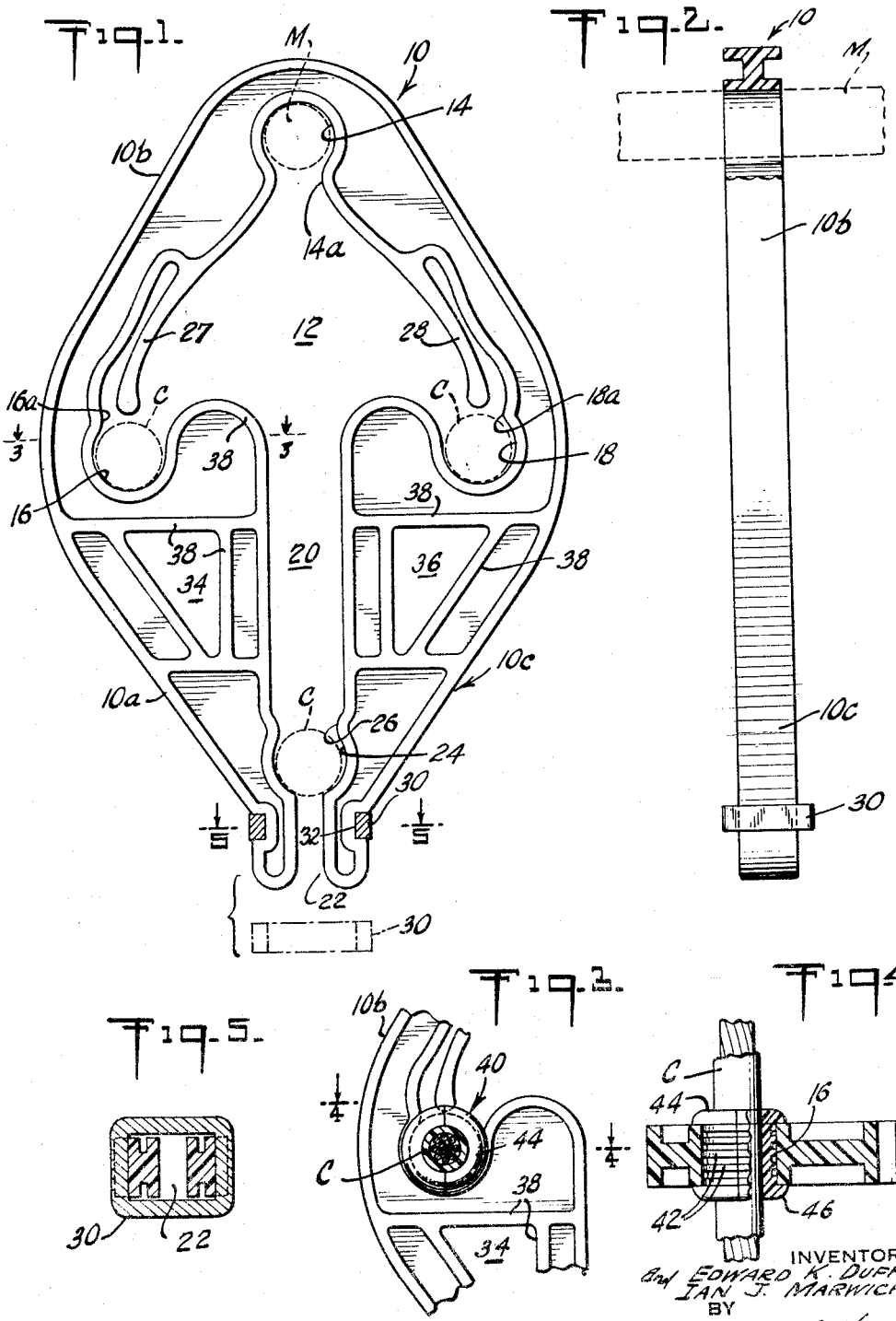

2,934,587

CABLE SPACERS

Edward K. Duffy and Ian J. Marwick, Rome, N.Y., assignors to Rome Cable Corporation, Rome, N.Y., a corporation of New York Application April 8, 1958, Serial No. 727,094

11 Claims. (Cl. 174—41)

This invention relates to a cable hanger and more particularly to such a device by which the member elements of a cable are supported in spaced relation one to the other. A specifically contemplated use of the device disclosed herein is in connection with cable of a kind comprising a messenger, which is ordinarily without insulation covering, and electrical conductor means, ordinarily two or more insulated conductors. In such use the device is mounted on the messenger, adjacent or between poles which serve to support the cable and particularly the messenger element thereof.

In cable spacers of this type it is, of course, important to maintain sufficient spacing between the cable elements to prevent arcing between conductors, surface flash-over or tracking. The spacing means, in addition to having excellent insulating properties, must also have high flexural strength and low moisture absorption, and they must be simple, inexpensive and easy to install.

Cable spacers of this type commercially available at the present time are unsatisfactory because they are complicated in structure, employ a plurality of parts and are too expensive to make and install.

It is an object of this invention to provide a cable spacer overcoming the disadvantages of the prior art.

Another object of the invention is to provide a unitary spacer member eliminating the need of assembling any parts.

Another object of the invention is to provide a spacer device of increased safety in which all of the cable elements are seated within a closure and are thus under control and continue to be supported even if for any reason one or more of them should become unseated.

Another object of the invention is to provide a combination of spaced, cable element receiving seats, and coacting resilient adapters to insure a snug fit of the cable elements in their respective spacer seats.

The invention will be best understood if the following description is read in connection with the drawing in which—

Figure 1 is a plan view of a cable hanger embodying our invention,

Figure 2 is a side elevation of the device shown in Figure 1,

Figure 3 is a detail view taken on the line 3—3 of Figure 1, showing an insulated conductor with an adapter thereon in seated position, Figure 4 is a cross-sectional view taken on the line 4—4 of Figure 3, with the adapter partly broken away, and Figure 5 is a cross-section taken on the line 5—5 of Figure 1.

As shown in Figure 1 the device is a unitary member 10, which is more or less horseshoe shaped, defining a substantial closure around a space, which comprises a plurality of cable member receiving seats, and an access slot.

The intermediate or body portion 10b of member 10 substantially encloses the space 12 which opens into the cable element receiving seats 14, 16, and 18. The end portions 10a and 10c co-act to provide the access slot 20 through which cable members may be individually inserted into space 12, and from space 12 into the seats 14, 16 and 18 where they are resiliently held in the desired spaced position.

Access slot 20 comprises a narrow outer portion 22 which communicates with a portion 24 of a diameter wider than portion 22 and also wider than a portion 26 which adjoins portion 24 in the direction of the space 12. Space 24 constitutes an additional seat for a fourth cable member.

The hanger member is made of a material sufficiently resilient to permit the end portions 10a and 10c to be sprung apart, thus allowing a cable member of greater diameter than portion 22 of the access slot to be inserted through the access slot 20 into the space 12.

The device disclosed herein is mounted on a messenger M by springing the end portions 10a and 10c apart sufficiently to slip the device over and around the messenger, which is then engaged in seat 14, which is a circular area of greater diameter than the space or slot 14a through which the messenger passes in travelling from the larger space 12, which is common to all of the seats 14, 16 and 18, into the seat 14.

Next, if the cable comprises two conductors C in addition to the messenger, the conductors are inserted through the access slot 20 while the end portions 10a and 10c are sprung apart for this purpose, and they are snapped into the respective seats 16 and 18, each of which is a space of larger diameter than the spaces or slots 16a and 18a, respectively, which communicate between the space 12 and said seats.

The narrow spaces or slots 16a and 18a may be formed in a variety of ways as, for example, in the manner shown in connection with seat 14, or by providing resilient arms such as members 27 and 28 shown in connection with seats 16 and 18 projecting from the inner edges of opposed portions of the intermediate or body portion 10b of the hanger, thus providing what are essentially spring catches each easily displaced to permit an element to move by its free end into its seat, and adapted to resist inadvertent unseating of a cable member from its seat.

If the cable system comprises a third insulated conductor it will be inserted last through access slot 20 for seating in seat 24.

In order to further insure against inadvertent unseating of a cable element, the band or ring 30 is slipped over the lower ends of end portions 10a and 10c, while they are flexed toward one another, and engaged in the groove 32 provided in the outer surface of members 10a and 10c adjacent their extreme lower ends, and below the seat 24.

The resiliency of the arms 10a and 10c of the hanger clip serves to keep the band 30 seated in groove 32. The presence of a cable element in seat 24 aids in locking the band 30 in groove 32 and of course the locking action of band 30 keeps the cable element locked in seat 24. If the cable system comprises only two conductors, a spacer not shown may be placed in seat 24 to spread the spring arms 10a and 10b and thus aid in keeping the lock band or ring 30 in the groove 32.

As shown herein the unitary spacer member is provided with spaces 34 and 36, and is provided with ridges 38 which run in various directions, to strengthen the structure and also serve to increase the flash-over distance between conductors seated in seats 16 and 18, and also between conductors seated in seats 16 and 24, or 18 and 24.

If desired, adapters 40 which are essentially cylindrical members of desired physical characteristics which are slit longitudinally to allow them to be inserted over portions of the cable members, may be placed around the portions of the cables elements which are to be inserted in said seats respectively. Such adapters aid in snugly fitting a cable member within its seat. They are desirably resilient and have low cold flow, and low temperature flexibility, and freedom from deterioration due to exposure and aging. We prefer to use the adapter illustrated in Figures 3 and 4, which is a resilient annular member comprising a number of compression rings 42 between the end shoulders 44 and 46 which are of greater diameter than the compression rings 42 and of greater diameter than the spacer seat in which the member is inserted together with the cable element around which it has been mounted. We have had very good results using adapters made of a synthetic elastomer such for example as molded "Neoprene."

When adapters are used and the system comprises a third conductor, the latter, which will be the last of the cable elements to be seated, will preferably be first passed all the way through the access slot 20 into the central space 12, and the snap band or ring 30 will then be engaged in groove 32, after which the cable element will be moved back through slot 20 to its seat 24.

When it is desired to remove the snap band or ring 30 from groove 32 the cable member in seat 24 is first forced up out of its seat 24 and passed into the space 12, after which the lower ends of the body member are sprung together freeing ring 30 from tension and permitting its removal from groove 32. There is thus a mutual locking effect obtained by the coaction of ring 30 in groove 32 and a cable member in seat 24. When seated in groove 32 ring 30 narrows the entrance end of the access slot 20, preventing the lower ends of the body member from being sprung apart to increase the width of the entrance end of the access slot, and while a cable member remains seated in seat 24 it prevents the lower ends of the body member from being moved together sufficiently to release ring 30 from groove 32. However the device is resilient enough to permit a cable member seated in seat 24 to be pushed out of seat 24 through the narrower portion of the access slot just above seat 24 and into the space 12.

It will be understood that adapters of different diameter may be provided to compensate for different sizes of cables.

However, the resilient adapter disclosed herein with the deformable rings 42 provides a snug fit in a spacer seat for cable elements within a range of diameters. Thus one size of adapter will accommodate cable elements within a range of sizes, and a different adapter is not needed for each different cable element size. This results in reducing the overall costs of the adapters and the number which must be kept in stock.

For the cable spacer a variety of materials may be employed, especially plastic materials having resistance to arcing, flash-over and tracking, low moisture absorption and dielectric loss, and flexural strength. We have obtained very excellent results using spacers made of methyl methacrylate.

The resiliency of our adapter like the resiliency of insulation on a conductor in seat 24 facilitates pushing a conductor from seat 24 up into space 12 in order to release the lock ring 30.

The band or snap ring 30 is desirably of high mechanical strength. We have had very successful results using snap rings made of a reinforced plastic such as a glass fibre-melamine laminate.

There has thus been provided a device in which the above mentioned objects are successfully attained in a thoroughly practical manner.

What we claim is:

1. In an aerial cable system comprising a number of cable members including a messenger, the means for supporting the non-messenger cable members from the messenger member and at the same time spacing the members from one another which comprises, a unitary resilient insulating enclosure the upper portion of which defines an internal space comprising a wider space portion opening at the top into a narrower space portion, and the lower portion of which comprises two parts spaced apart and defining a slot leading to said wider space portion and through which said messenger cable member may be led into the wider space portion and seated in the said narrower space portion and through which a plurality of said non-messenger cable members may be led into said wider space portion, the internal edges of the enclosure which define the wider space portion being indented to form a plurality of spaced seats for said non-messenger members.

2. The aerial system claimed in claim 1 including locking means for closing the lower end of said slot, opposed portions of the inner edges of the said parts defining an additional seat to receive a non-messenger cable member, said additional seat co-acting with said locking means to prevent unlocking of the locking means while a cable member is seated in said seat and until a cable member seated in said additional seat is moved from its seat upwardly into said wider space portion.

3. An aerial cable system comprising a number of cable members, one of which is a messenger, and means for supporting the non-messenger cable members from the messenger cable member and at the same time spacing the members from one another comprising, a unitary insulating enclosure in which all the cable members are enclosed, said enclosure defining a wider space between two narrower spaces, the lower of said narrower spaces being a slot defined by spaced parts comprising the lower portion of said enclosure, the width of said slot at its lower end being reduced to less than the diameter of said cable members, the said enclosure being sufficiently resilient to permit the said parts of its lower portion to be sprung apart, a groove in the outer edges of the said parts, and a locking ring insertable in said groove and adapted to prevent inadvertent springing apart of said parts, the portion of the slot which is above the narrower lower end portion thereof comprising an additional seat for a cable member, the size of the locking ring, the depth of said groove and the width of said slot being interrelated in such a way that removal of the locking ring from its groove is prevented by a cable member seated in said additional seat, and until the cable member is moved from said additional seat upwardly into said wider space.

4. An aerial cable system comprising a number of cable members, one of which is a messenger, and means for supporting the non-messenger cable members from the messenger cable member and at the same time spacing the members from one another comprising a unitary insulating enclosure in which all the cable members are enclosed, said enclosure defining a wider space between two narrower spaces, the lower of said narrower spaces being a slot defined by spaced parts comprising the lower portion of said enclosure, the width of said slot at its lower end being reduced to less than the diameter of said cable members, the said enclosure being sufficiently resilient to permit the said parts of its lower portion to be sprung apart for passage of said cable members individually through said slot to and from said wider space, the upper of said narrower spaces serving as a seat for the messenger cable member, and the internal edge of the enclosure defining said wider space being shaped to provide a plurality of seats spaced from one another and from said upper narrower space for non-messenger cable members.

5. The aerial cable system claimed in claim 4 in which the internal edge of the enclosure which defines the said wider space is curved downwardly on opposite sides of the upper end of said slot forming a plurality of seats for cable members disposed on opposite sides of the slot and below the upper end of the slot.

6. A multi-conductor high voltage aerial cable system comprising, a messenger and a plurality of non-messenger cable members, and means for supporting the non-messenger cable members from the messenger member in spaced relation from one another and from the messenger comprising, an insulating member in the general form of an inverted U, the lower ends of the legs of said member being normally spaced apart a distance less than the diameter of any of said cable members, the support member being sufficiently resilient to permit the lower ends of its legs to be sprung apart sufficiently for passage of said cable members individually between the lower ends of said leg portions and into a wider space defined by the upper inner edge of the support member and extending laterally beyond the spacing between the lower ends of said leg portions, said upper inner edge being indented at intervals spaced from one another to provide seats for said messenger cable member and for a plurality of non-messenger cable members.

7. The aerial cable system claimed in claim 6 including locking means adapted to prevent the lower ends of said legs from being sprung apart, and additional means for preventing accidental escape of any of the cable members from within said enclosure member comprising an additional cable seat defined by opposed portions of said legs directly above the locking means and operative as an additional seat for a cable member when the said locking means is operative, the presence of a cable member in said additional seat when the locking means is operative serving to prevent the lower ends of said legs from being moved toward one another sufficiently to permit the locking member to be unlocked.

8. In combination, a cable comprising a noninsulated messenger and a plurality of insulated conductors, a hanger spacer means for spacing the insulated conductors from one another and from the messenger while supporting the insulated cable members from the messenger, said hanger spacer means being a unitary insulating member defining an enclosure the upper portion of which defines an internal space comprising a wider space portion opening at the top into a narrower space portion, and the lower portion of which comprises two parts spaced apart and defining a slot leading to said wider space portion through which said messenger may be led into the wider space portion and seated in the said narrower space portion and through which said insulated conductors may be led into said wider space portion, the internal edges of the enclosure which define the wider space portion being indented to form a plurality of spaced seats for said insulated conductors respectively.

9. A hanger spacer member for supporting a number of insulated conductors from a messenger and for seating the insulated conductors spaced from one another and from said messenger which comprises, a unitary insulating enclosure member defining a wider space between two narrower spaces, the lower of said narrower spaces being a slot defined by spaced parts of the lower portion of said enclosure member, the width of said slot at its lower end being reduced to less than the diameter of said messenger and each of said insulated conductors, the said enclosure being sufficiently resilient to permit the said parts of its lower portion to be sprung apart for insertion of said messenger and said insulated conductors through said slot into said wider space, the upper of said narrower spaces being a seat for a messenger, and the edge of said enclosure member defining said wider space being indented to provide a plurality of seats for said insulated conductors, said seats being spaced from one another and from the upper of said narrower spaces.

10. The device claimed in claim 9 including a groove in the outer edges of the said parts comprising the lower portion of said enclosure member, below the top of the reduced portion of said slot and a locking ring insertable in said groove and adapted to prevent inadvertent springing apart of said parts.

11. The device claimed in claim 9 including a groove in the outer edges of the said parts comprising the lower portion of said enclosure member, below the top of the reduced portion of said slot and a locking ring insertable in said groove and adapted to prevent inadvertent springing apart of said parts the size of the locking ring, the depth of said groove and the width of said slot being interrelated in such a way that removal of the locking ring from its groove is prevented by the presence of a conductor in said slot above the said reduced portion of the slot whereby the locking ring is locked in locking position until the conductor member within said slot is moved upwardly out of said slot into said wiper space.

References Cited in the file of this patent

UNITED STATES PATENTS

| 1,025,098 | Morey | Apr. 30, 1912 |
| 2,004,695 | Hager | June 11, 1935 |
| 2,727,089 | Cuccaro | Dec. 13, 1955 |
| 2,820,083 | Hendrix | Jan. 14, 1958 |
| 2,839,597 | Hendrix | June 17, 1958 |